United States Patent [19]

Siegel

[11] 4,304,615
[45] Dec. 8, 1981

[54] METHOD OF AND MEANS FOR PRODUCING PLASTIC BAGS HAVING SEPARABLE PLASTIC FASTENERS

[75] Inventor: Karl-Heinz Siegel, Nuremberg, Fed. Rep. of Germany

[73] Assignee: Minigrip, Inc., Orangeburg, N.Y.

[21] Appl. No.: 119,793

[22] Filed: Feb. 8, 1980

[51] Int. Cl.³ .................. B29C 27/06; B29C 27/08
[52] U.S. Cl. .................................. 156/73.3; 156/66; 156/251; 156/515; 156/580.2; 493/194; 493/203; 493/209
[58] Field of Search .................. 156/66, 73.1, 73.3, 156/251, 515, 580.1, 580.2; 493/194, 203, 209

[56] References Cited

U.S. PATENT DOCUMENTS

| | | | |
|---|---|---|---|
| 3,438,428 | 4/1969 | Balamuth et al. | 156/580.1 |
| 3,457,132 | 7/1969 | Tuma et al. | 156/580.2 |
| 3,524,783 | 8/1970 | Sutherland | 156/251 |
| 3,554,822 | 1/1971 | Schwarzkopf | 156/66 |
| 3,749,620 | 7/1973 | Montgomery | 156/73.1 |
| 3,859,150 | 1/1975 | Van Amburg | 156/66 |
| 4,025,374 | 5/1977 | Spindler et al. | 156/73.1 |
| 4,059,478 | 11/1977 | Hoffman | 156/580.1 |

FOREIGN PATENT DOCUMENTS 664523 9/1965 Belgium .
1629218 4/1970 Fed. Rep. of Germany .

*Primary Examiner*—Michael G. Wityshyn
*Attorney, Agent, or Firm*—Hill, Van Santen, Steadman, Chiara & Simpson

[57] ABSTRACT

Method of and apparatus for producing plastic bags having separable plastic fasteners. A strip of bag making material is advanced step-by-step by bag width sections into a tear sealing station where the strip is retained for a dwell interval. In the station, the separable fastener means of the bag material is subjected to ultrasonic tear sealing as by means of a sonotrode along a bag edge defining line extending across the strip. Also in such station, the thinner bag body material is heat tear sealed along the bag side edge defining line as by means of a heat bar coordinated in operation with the ultrasonic sealing. The sonotrode has a profile comprising a tear line edge and material controlling and sealing rib means spaced from the tear line sealing edge.

22 Claims, 5 Drawing Figures

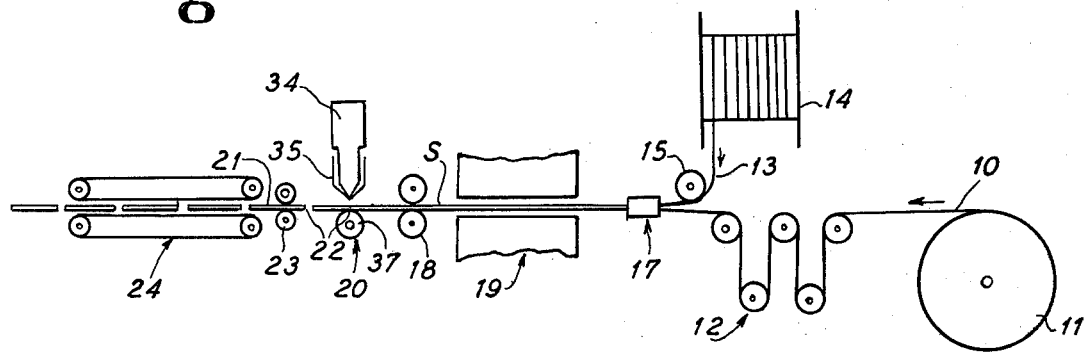
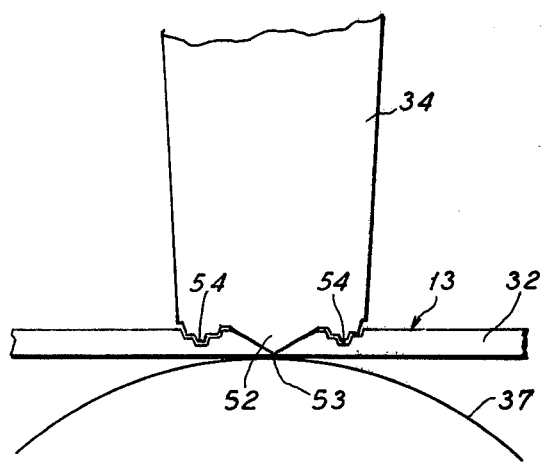 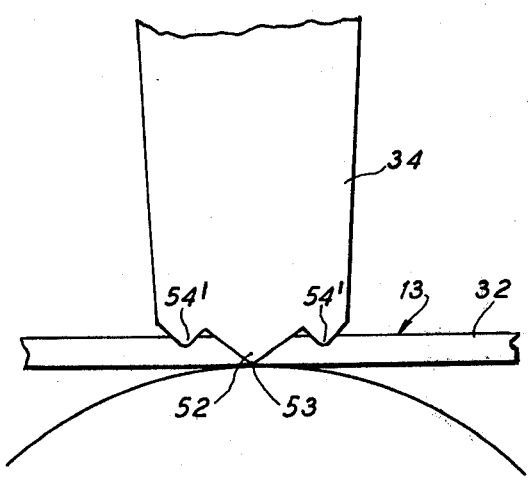
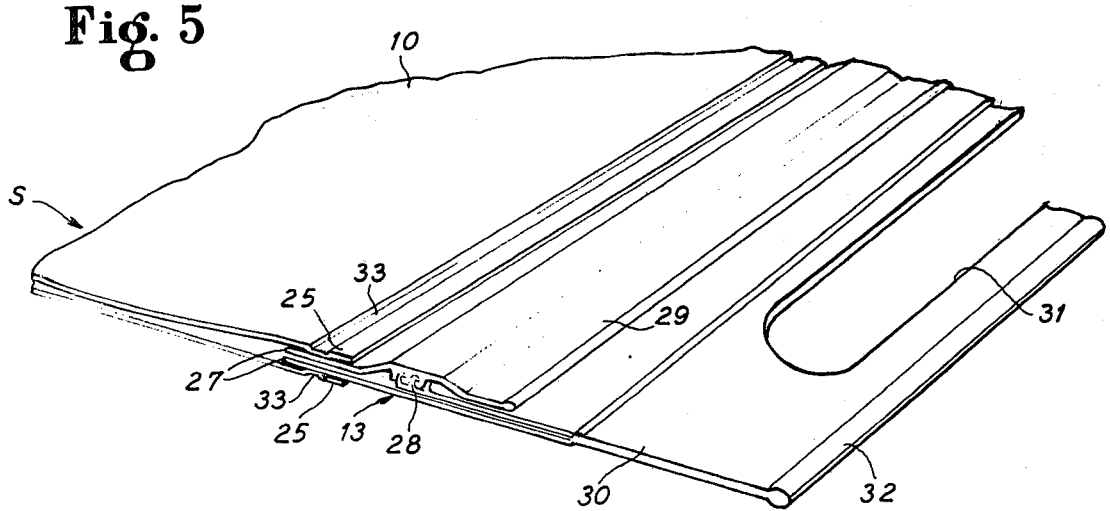

METHOD OF AND MEANS FOR PRODUCING PLASTIC BAGS HAVING SEPARABLE PLASTIC FASTENERS

This invention relates to the production of plastic bags having separable plastic fasteners, and is more particularly concerned with improvements in tear sealing bag material into bag sections.

Material for making plastic bags with separable plastic fasteners of either the press-on or slide fastener type is customarily supplied in continuous strip form and then tear sealed across the strip material into bag sections. Although the strip material may consist of an extrusion in which the thin bag body part and the separable fasteners are integrally extruded, another method comprises making the strip from separately formed thin bag body material and separable plastic fastener means. The separately formed body material and fastener means are then joined continuously and thereafter separated into separate bag sections. In joining the bag material and the separable fastener means, the separable fastener parts are in interlocked position and then placed between the margins of the folded bag body plastic film with the fasteners welded to the film by heat sealing or electronic fusion. Thereafter, the bag making film fastener strip may be advanced through a plurality of tear sealing stations where the film fastener strip is sealed across the bag side edge defining lines. Then individual bag sections are obtained by tearing the sections from one another along the tear seals. By way of example, Belgian Pat. No. 664523 and German laid open application Offenlegungsschrift No. 1629218 are referred to as relevant to the general process of joining separable closure fasteners to bag body material and then separating the same into bag sections.

The bag making film fastener strip consists of a relatively thin film bag body material and a separable fastener means that is joined coextensively along a longitudinal edge of the body material which is to become the top or opening ends of the bags, and which fastener means has a substantially greater unit mass. A problem is encountered due to the relative differential in the unit mass modulus, since the fastener strip modulus is greater, i.e., thicker, than the unit mass modulus of the relatively substantially thinner bag body material or film. The aforesaid German publication No. 1629218 has addressed this problem by effecting individual sealing of the body material by a cross tear seal bar and separately sealing the fastener means in a timed sequence.

The prior expedients still leave much to be desired and have various disadvantages, drawbacks, inefficiencies and inherent shortcomings. Namely, the spatial requirements are expanded by need for a plurality of successive stations or steps for sealing the body portion of the bag material and the fastener portion of the bag material. Also, there is the difficulty in attaining proper alignment of the respective body and fastener cross seals. This difficulty arises due to numerous factors such as differences in tension, differences in elasticity of the material from place-to-place thereon or therealong, temperature affecting elasticity, the type of material, and the like. Some of the differential cross seals or spot seals will not match along the desired seal line. When this happens, the material must be scrapped.

By the present invention, the foregoing problems are overcome, whereby not only is working space substantially conserved, but substantially new and improved results are attained in the cross sealing of the bag material.

To this end, the present invention provides a method of producing plastic bags having separable plastic fasteners on one end, and in which the bags are formed by severing bag sections from a continuous integral film fastener strip, comprising thin bag body material having coextensively along a longitudinal edge separable fastener means of substantially greater unit mass modulus than the bag material, thereby requiring different tear sealing techniques to effect separation of the strip into bag sections, advancing said strip step-by-step by bag width sections into a tear sealing station, retaining said strip for a short dwell interval in said station as each section is advanced into said station, subjecting said separable fastener means in said station during said dwell interval to ultrasonic tear sealing aligned with a bag edge defining line extending across said strip, and subjecting said bag body material in said station during each said dwell to heat tear sealing along said bag side edge defining line and coordinated with said ultrasonic sealing.

The present invention also provides an apparatus for producing plastic bags having separable plastic fasteners on one of their ends, and in which the bags are formed by severing bag sections from a continuous integral bag film comprising thin bag body material having coextensively along a longitudinal edge separable fastener means of substantially greater unit mass modulus than the bag material, thereby requiring different tear sealing techniques to effect separation of the strip into bag sections, a tear sealing station and means for advancing the strip step-by-step by bag width sections into such station wherein the strip is retained for a short dwell interval as each section is advanced into said station, means in said station operable during each dwell interval for subjecting said separable fastener means to ultrasonic tear sealing aligned with a bag side edge defining line extending across said strip, and means in said station operable during each said dwell interval for subjecting said bag body material to heat tear sealing along said bag side edge defining line and coordinated with said ultrasonic sealing.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a schematic side elevational view of an automatic bag making machine embodying the features of the present invention;

FIG. 3 is an enlarged fragmentary elevational view taken substantially along the line III—III of FIG. 2;

FIG. 4 is a view similar to FIG. 3 but showing a slight modification; and

FIG. 5 is an enlarged fragmentary perspective view showing the bag material and illustrating the substantial differences in unit mass modulus of the bag body material compared to the separable closure portion of the bag material.

Figure 2:
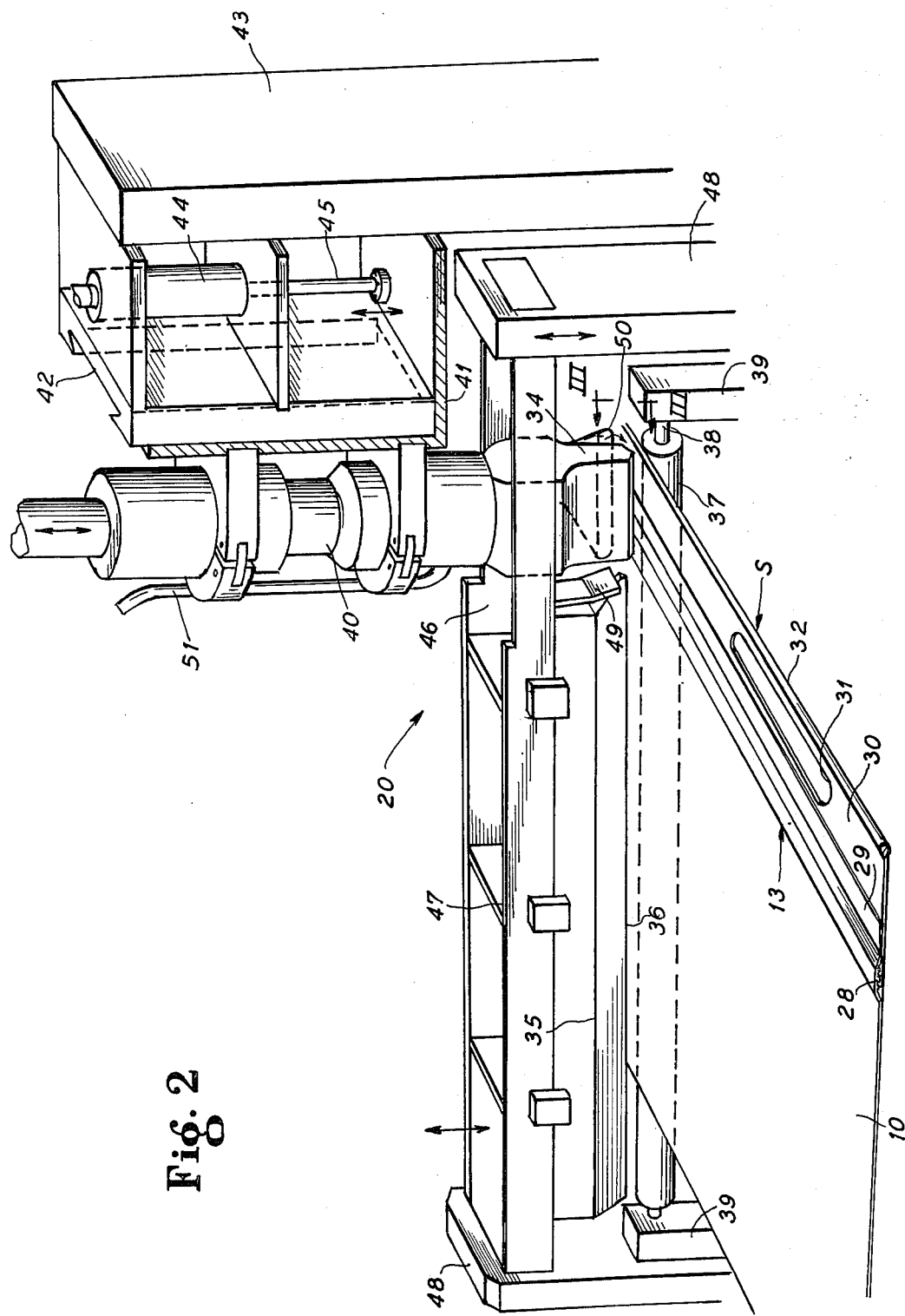
FIG. 2 is an enlarged fragmentary perspective detail view of the cross sealing station of the apparatus.

On reference to FIG. 1, flattened thin thermoplastic synthetic film material 10 which may be in the form of an endless extruded flattened tube or double folded half tube of the proper width for the size of bag to be produced is supplied in endless strip form from a roll 11. Thence, the plastic film bag material 10 passes to and through a set of take-up dancer roller 12 of the type customarily employed where endless material is intermittently fed through working stations. Thermoplastic synthetic separable fastener means 13 is supplied from a stock roll 14 and guided by a guide roller 15 toward meeting and joining the bag body material 10. Such joining is effected at a joining station 17 where the separable fastener means 13 is brought into proper orientation coextensively along a longitudinal edge of the flattened bag body material 10. Pull rollers 18 intermittently advance the plastic assembly step-by-step into and through a sealing station 19 where stringers of the separable fastener means are permanently secured by any preferred heat sealing or electronic sealing means to the one selected bag mouth forming edge of the bag body material. This produces a continuous integral strip S from which bag body sections are adapted to be formed by tear sealing across the strip S in a tear sealing station 20 in coordinated relation with the step-by-step advance effected by the driving or advancing rollers 18. Beyond the station 20 successive bag sections 21 into which the strip S is divided by tear seals 22 are adapted to be successively torn from the leading end of the strip by differentially driven tear off rollers 23 and then moved by conveyor means 24 to a desired destination.

For a better understanding of a desirable form of the continuous integral bag making strip S for which the present invention is especially suitable, reference may be had to FIG. 5. The folded flattened thin bag body material 10 has coextensively along the longitudinal bag mouth edge matching opposite margins 25 to the inner sides of which are secured respective stringers 27 of the separable fastener means 13 comprising complementary separable closure or fastener profiles generally identified at 28 and which may be of the slider or finger pressure closure type. In this instance, the separable fastener means comprises a pull flange 29 on one of the fastener strips and a pull flange extension 30 on the other of the fastener strips whereby hang-up bags are adapted to be made each having a hang-up or handle opening 31, with a reinforcing bead 32 along the top edge. Such bags can be readily opened by pulling the pull flange 29 and the handle extension 30 in opposite directions to separate the interengageable resiliently flexible fastener profiles 28. When it is desired to close the bag, the fastener profiles 28 are pressed together into interengaging closing relation. Joining of the stringers 27 to the margins 25 is effected by separating the margins 25 at the station 17 and orienting the stringers 27 between the margins 25, whereafter the margins 25 and the stringers 27 are permanently sealed together along lines 33 in the station 19. As will be readily observed in FIG. 5, the separable fastener means 13 has a much greater mass modulus than the bag body material 10, so that different tear sealing techniques are desirable to effect separation of the strip S into bag sections 21.

According to the present invention, a substantially new and improved method is provided for effecting efficient, economical, space-saving, rapid, multi-technique tear sealing of the bag making strip S along the bag edge defining seal lines 22 in the single cross tear sealing station 20. For this purpose, as the bag making strip is advanced, step-by-step by bag width sections into the station 20 and is retained for a short dwell interval as each section is advanced into such station, means in the station 20 comprising an ultrasonic tear sealing device 34, which is operable during each dwell interval for subjecting the separable fastener means 13 to ultrasonic tear sealing aligned with a bag side edge defining line extending across the strip. Coordinated with the ultrasonic sealing means, means comprising a heat sealing bar 35 in the station 20 is operable during each dwell interval for subjecting the bag body material to heat tear sealing along the same bag side edge defining line. Both of the means 34 and 35 operate against underlying anvil means 37 in this instance in the form of a freely rotatable roller 37 mounted on an axle 38 carried by fixed frame means 39. The strip S is firmly supported on the anvil 37 for the tear sealing procedure. While the bar 35 is desirably simply a heated bar which for its tear sealing function may be heated to about 400° C., the ultrasonic tear sealing device 34 is desirably in the form of a sonotrode which operates at much lower working temperatures. The bar 35 functions by melting the plastic bag material 10 by external application of heat by contacting the bag body material 10 with an elongate heat sealing edge 36 of the bar. On the other hand, the sonotrode 34 functions by means of ultrasonic impulses causing fusion by internal molecular agitation or energization of the plastic material engaged thereby and is effective in a more limited area than where external heat is applied to effect fusion. Therefore, the tear sealing action of the sonotrode 34 is more desirable in respect to the greater mass modulus of the fastener means 13 than the direct heat sealing, that is suitable by means of the bar 35 with respect to the much smaller mass modulus of the bag body material 10.

In a desirable arrangement, the sonotrode 34 and the bar 35 are mounted for coordinated but independent movement into and out of heat and tear sealing engagement with the anvil 37. For this purpose, the sonotrode 34 is mounted for vertical reciprocations toward and away from the anvil 37 by means of an operating structure 40 mounted on a bracket 41 which is vertically reciprocatingly guided by a dovetail channel way 42 on a machine frame 43. A direct acting pressure fluid actuator 44 which may be a pneumatic cylinder carried by the frame 43 has an operating piston 45 secured to the bracket 41. It will be understood that operation of the actuator 44 for driving the sonotrode 34 into and out of heat sealing engagement with the anvil 37 is sequentially coordinated with the sealing station 19 and the advancing means rollers 18.

For its function, the heat sealing bar 35 is mounted on a horizontal frame 47 extending in suitably spaced overlying relation to the path of the strip S and carried by vertically reciprocable bars 48 to which the opposite ends of the elongate frame 47 are secured. Suitable means, not shown, are provided for vertically reciprocating the bars 48 and thereby the frame 47 and the bar 35 thorugh a narrow vertical range of movement into and out of heat and tear sealing engagement with the anvil 37 and through the bag body material 10, in coordination with the sonotrode 34. A clearance opening 46 in the heat bar carrying frame 47 accommodates the sonotrode 34 operatively therethrough in depending relation.

It is desirable to have the sonotrode 34 and the bar 35 separately activated because in each tear sealing cycle, it is desirable to advance the sonotrode 34 into its heat and tear sealing engagement with the fastener means 13 sufficiently, but only slightly, in advance of the engagement of the heat sealing bar edge 37 with the bag body material 10. In practice, however, the entire tear sealing operation may take only about 1/10 of a second.

In order to prevent overheating the sonotrode 34 by the heat from the adjacent end of the heat sealing bar 35, a heat shield 49 is carried by the frame 47 and depends into a gap between the adjacent ends of the sonotrode 34 and the bar 35. In addition, the sonotrode 34 is desirably air cooled by means of a nozzle 50 directed theretoward and supplied with cooling air as by means of a duct 51 connected to the nozzle. It may be desirable to operate the air nozzle 50 intermittently in coordination with the operation of the sonotrode in its tear sealing function so as to also effect cooling of the tear seal formed by the sonotrode 34 at the end of each tear seal forming stroke of the sonotrode and continuing until the strip S has been advanced another bag section through the station 20 and the sonotrode is again cycled into a tear sealing stroke.

As best visualized in FIG. 3, the sonotrode 34 is desirably provided with a tear seal forming tip of special profile construction. At its tear seal forming tip, the sonotrode has a tear line profile area comprising a primary seal forming profile 52 of a sufficient length to press a tear line at an elongate edge 53 into the fastener means 13 and toward the anvil 37. In a preferred construction, the sides of the primary seal forming profile 52 are at an angle of about 120° and converge toward the edge 53 from respective parallel spaced sealing impression profile ribs 54 which form that part of the sonotrode tip profile along each side of the tear line forming convergently tapered primary profile area 52. Each of the ribs 54 projects from the tip of the sonotrode 34 less than the tear line forming profile area 52, but nevertheless sufficiently so that each of the ribs 54 presses sealingly partially into the softened thermoplastic fastener means 13. In addition, the ribs serve as retainers against undesirable squeezing displacement to opposite sides of the tear line forming structure of the plastic materials i.e., incident to the forming action of the profile area 52 thereby providing a better watertight seal at this location. Each of the ribs 54 may be of a stepped cross-sectional shape as shown whereby the parallel sealing lines formed thereby in the fastener means 13 will be of a complementary stepped cross-sectional indented profile formation.

If preferred, the sonotrode 34 may have a forming tip profile arrangement as shown in FIG. 4, wherein the tear line forming profile area 52 may be substantially the same as in FIG. 3, but the profile ribs 54' may be narrower and shallower than the corresponding ribs 54 in FIG. 3. Nevertheless, the ribs 54' serve a similar function and assure thorough sealing of the fastener means 13 along the tear seal and retention of the material against undesirable spreading lateral displacement away from the tear line defined by the profile area 52 and more particularly the tear line edge 53 thereof.

By having the edge 53 of the sonotrode 34 and the edge 36 of the bar 35 in longitudinal alignment, the tear seal along each edge of each of the bag sections is rapidly and efficiently effected by the coordinated operation of the sonotrode 34 and the heat sealing bar 35 in minimum space and with assured accuracy and efficiency and free from distortions which have been experienced where heat sealing has been effected in separate spaced steps.

It will be understood that variations and modifications may be effected without departing from the spirit and scope of the novel concepts of this invention.

I claim as my invention:

1. In a method of producing plastic bags having separable plastic fasteners on one end, and in which the bags are formed by severing bag sections from a continuous integral film and fastener strip in which thin bag body material has in a relatively narrow area extending coextensively along a longitudinal edge separable fastener means of substantially greater unit mass modulus than the bag body material, and the body material and the fastener means thereby requiring different tear sealing techniques to effect separation of said strip into bag sections:

advancing said strip step-by-step by bag width sections into a tear sealing station;
retaining said strip for a short dwell interval in said station as each section is advanced into said station;
subjecting said relatively narrow separable fastener means area in said station during said dwell interval to ultrasonic tear sealing including pressing thereacross and into the fastener means area a first elongate tear sealing edge means along a bag edge defining line which extends across said strip;
and subjecting said bag body material in said station during each said dwell to heat tear sealing along said bag side edge defining line including pressing a second elongate tear sealing edge means longitudinally aligned with but separated at its adjacent end from said first edge means and coordinated in operation with said ultrasonic sealing first edge means.

2. A method according to claim 1, comprising effecting said ultrasonic tear sealing by operating a sonotrode having said first edge means.

3. A method according to claim 2, which comprises operating said sonotrode reciprocably into and out of engagement with the fastener means in advance of operation of said second tear sealing edge means.

4. A method according to claim 1, which comprises driving said first edge means as a tear line forming profile into and across said separable fastener means, and coordinated therewith pressing sealing and material displacement profile ribs parallel to and spaced laterally at opposite sides of said tear line profile area into said fastener means area to less depth than said first edge means.

5. A method according to claim 1, comprising during said ultrasonic tear sealing forming a tear line across said fastener means area by the pressing of said first edge means and also effecting sealing impressions into said fastener means area to less depth than said first edge means and in parallel spaced relation at opposite sides of the tear line.

6. A method according to claim 1, comprising by the pressing of said first edge means forming a tear seal line across said fastener means area, and controlling lateral displacement of material of the fastener means area at opposite sides of the tear line by impressing stepped profiles into said area adjacently spaced from said first edge means.

7. A method according to claim 1, which comprises providing a heat shield between the adjacent ends of said first and second edge means.

8. A method according to claim 1, which comprises applying temperature controlling air to said first edge means.

9. An apparatus for producing plastic bags having separable plastic fasteners on one of their ends, and in which the bags are formed by severing bag sections from a continuous integral film and fastener strip in which thin bag body material has in a relatively narrow area extending coextensively along a longitudinal edge separable fastener means of substantially greater unit mass modulus than the bag body material, and the body material and the fastener means thereby requiring different tear sealing techniques in order to effect separation of said strip into bag sections:

a tear sealing station and means for advancing said strip step-by-step by bag width sections into such station wherein said strip is retained for a short dwell interval as each section is advanced into said station including a first elongate tear sealing edge;

means in said station operable during each dwell interval and adapted for subjecting said relatively narrow separable fastener means area to ultrasonic heating and tear sealing pressure by said first edge aligned with a bag side edge defining line extending across said strip;

and means in said station including a second elongate tear sealing edge longitudinally aligned with but separated at its adjacent end from said first edge an operable during each said dwell interval for subjecting said bag body material to heat tear sealing along said bag side edge defining line and coordinated in operation with said ultrasonic sealing means first edge.

10. Apparatus according to claim 9, wherein said ultrasonic tear sealing means comprises a sonotrode having said first edge.

11. Apparatus according to claim 10, including means for operating said sonotrode reciprocably into and out of engagement with the fastener means in advance of operation of said second tear sealing edge.

12. Apparatus according to claim 9, wherein said first tear sealing edge comprises a tear line profile, and profile ribs parallel to and spaced laterally at opposite sides of said first edge and adapted to function in coordinated relation with said first edge for pressing sealing engagement with the separable fastener means area to less depth than said first edge and for controlling material displacement relative to the action of said profile area.

13. Apparatus according to claim 9, comprising sealing impression ribs located in parallel spaced relation at opposite sides of said first edge for pressing into and across said area to less depth and said first edge.

14. Apparatus according to claim 9, including structure for controlling lateral displacement of material of the fastener means area to opposite sides of said tear line forming first edge.

15. Apparatus according to claim 9, including a heat shield between the adjacent ends of said first and second edges.

16. Apparatus according to claim 9, including means for applying temperature controlling air on said first edge means.

17. In a method of producing plastic bags having separable plastic fasteners on one end, and in which the bags are formed by severing bag sections from a continuous integral film fastener strip in which thin bag body material has coextensively along a longitudinal edge separable fastener means of substantially greater unit mass modulus than the bag material thereby requiring different tear sealing techniques to effect separation of said strip into bag sections:

advancing said strip step-by-step by bag width sections into a tear sealing station;

retaining said strip for a short dwell interval in said station as each section is advanced into said station;

operating a sonotrode and thereby subjecting said separable fastener means in said station during said dwell interval to ultrasonic tear sealing aligned with a bag edge defining line extending across said strip;

and operating a heat bar aligned with but adjacently spaced at one end from one end of said sonotrode and thereby subjecting said bag body material in said station during each said dwell to heat tear sealing along said bag side edge defining line and coordinated with said ultrasonic sealing.

18. A method according to claim 17, which comprises providing a heat shield between said adjacent ends of the sonotrode and the heat bar.

19. A method according to claim 17, which comprises applying temperature controlling air to said sonotrode.

20. An apparatus for producing plastic bags having separable plastic fasteners on one of their ends, and in which the bags are formed by severing bag sections from a continuous integral film fastener strip in which thin bag body material has coextensively along a longitudinal edge separable fastener means of substantially greater unit mass modulus than the bag material thereby requiring different tear sealing techniques in order to effect separation of said strip into bag sections:

a tear sealing station and means for advancing said strip step-by-step by bag width sections into such station wherein said strip is retained for a short dwell interval as each section is advanced into said station;

means comprising a sonotrode in said station operable during each dwell interval for subjecting said separable fastener means to ultrasonic tear sealing aligned with a bag side edge defining line extending across said strip;

and means in said station comprising a heat bar aligned with but adjacently spaced at one end from one end of said sonotrode and operable during each said dwell interval for subjecting said bag body material to heat tear sealing along said bag side edge defining line and coordinated with said ultrasonic sealing means.

21. Apparatus according to claim 20, including a heat shield between said adjacent ends of the sonotrode and the heat bar.

22. Apparatus according to claim 20, including means for applying temperature controlling air on the sonotrode.

* * * * *